(12) United States Patent
Dawicki et al.

(10) Patent No.: US 12,432,283 B2
(45) Date of Patent: Sep. 30, 2025

(54) METHODS AND APPARATUS FOR ONLINE TEST TAKING

(71) Applicant: Northeast Maritime Institute, Inc., Fairhaven, MA (US)

(72) Inventors: Eric Roger Dawicki, Fairhaven, MA (US); Akkhilaysh Kushal Shetty, New Bedford, MA (US); Angela Michele Dawicki, Fairhaven, MA (US)

(73) Assignee: Northeast Maritime Institute, Inc., Fairhaven, MA (US)

( * ) Notice: Subject to any disclaimer, the term of this patent is extended or adjusted under 35 U.S.C. 154(b) by 899 days.

(21) Appl. No.: 17/516,991

(22) Filed: Nov. 2, 2021

(65) Prior Publication Data

US 2022/0141298 A1 May 5, 2022

Related U.S. Application Data

(60) Provisional application No. 63/109,217, filed on Nov. 3, 2020.

(51) Int. Cl.
*G06T 7/70* (2017.01)
*G06N 20/00* (2019.01)
(Continued)

(52) U.S. Cl.
CPC ........... *H04L 67/535* (2022.05); *G06N 20/00* (2019.01); *G06T 7/70* (2017.01); *G06V 20/52* (2022.01);
(Continued)

(58) Field of Classification Search
CPC ....... H04L 67/535; G06V 20/52; G06V 40/20
See application file for complete search history.

(56) References Cited

U.S. PATENT DOCUMENTS 9,154,748 B2 * 10/2015 Hsu ................... G06Q 10/10
9,763,613 B2 * 9/2017 Shepherd ............. A61B 5/0022
(Continued)

FOREIGN PATENT DOCUMENTS

WO WO-2017058205 A1 * 4/2017

OTHER PUBLICATIONS

International Search Report and Written Opinion mailed Jan. 28, 2022 in connection with PCT/US2021/057722.
(Continued)

*Primary Examiner* — Dmitry Suhol
*Assistant Examiner* — Alyssa N Brandley
(74) *Attorney, Agent, or Firm* — Wolf, Greenfield & Sacks, P.C.

(57) ABSTRACT

The techniques described herein relate to methods and systems for administering an online examination to a user. A pre-examination scan is performed based on first image data of an environment of the user that is received from a camera. Responsive to an indication from the pre-examination scan that the environment is appropriate for test taking, the online examination is initiated. The online examination is initiated by generating a user interface for display on an examination screen. Based on second image data of the user while using the user interface, one or more poses of the user may be estimated. It may be determined that the user pose is indicative of improper examination behavior based on the one or more poses of the user that are estimated. A warning can be generated and/or the online examination can be terminated based on an indication of improper examination behavior.

20 Claims, 12 Drawing Sheets

(51) Int. Cl.
*G06V 20/52* (2022.01)
*G06V 40/20* (2022.01)
*G09B 5/08* (2006.01)
*G09B 7/00* (2006.01)
*H04L 67/50* (2022.01)
*H04L 67/54* (2022.01)

(52) U.S. Cl.
CPC ............... *G06V 40/20* (2022.01); *G09B 5/08* (2013.01); *G09B 7/00* (2013.01); *H04L 67/54* (2022.05)

(56) References Cited

U.S. PATENT DOCUMENTS

| | | | | |
|---|---|---|---|---|
| 9,892,315 | B2* | 2/2018 | Voss | G06V 40/176 |
| 2002/0172931 | A1* | 11/2002 | Greene | G09B 7/00 |
| | | | | 434/322 |
| 2011/0223576 | A1* | 9/2011 | Foster | G09B 7/02 |
| | | | | 434/362 |
| 2014/0222995 | A1 | 8/2014 | Razden et al. | |
| 2014/0240507 | A1 | 8/2014 | Hsu et al. | |
| 2015/0037781 | A1 | 2/2015 | Breed et al. | |
| 2015/0092978 | A1* | 4/2015 | Wu | G06V 40/23 |
| | | | | 382/103 |
| 2018/0225982 | A1* | 8/2018 | Jaeh | G09B 5/00 |
| 2019/0156689 | A1* | 5/2019 | Jaeh | G09B 5/00 |
| 2019/0197220 | A1* | 6/2019 | Anderson | G09B 7/00 |
| 2019/0197247 | A1* | 6/2019 | Anderson | H04L 67/52 |
| 2019/0197911 | A1 | 6/2019 | Anderson et al. | |

OTHER PUBLICATIONS

Extended European Search Report dated Sep. 19, 2024, in connection with European Application No. 21889914.4.
Atoum et al., Automated Online Exam Proctoring. IEEE Transactions on Multimedia. Jul. 2017;19(7):1609-24.
EP 21889914.4, Sep. 19, 2024, Extended European Search Report.

* cited by examiner

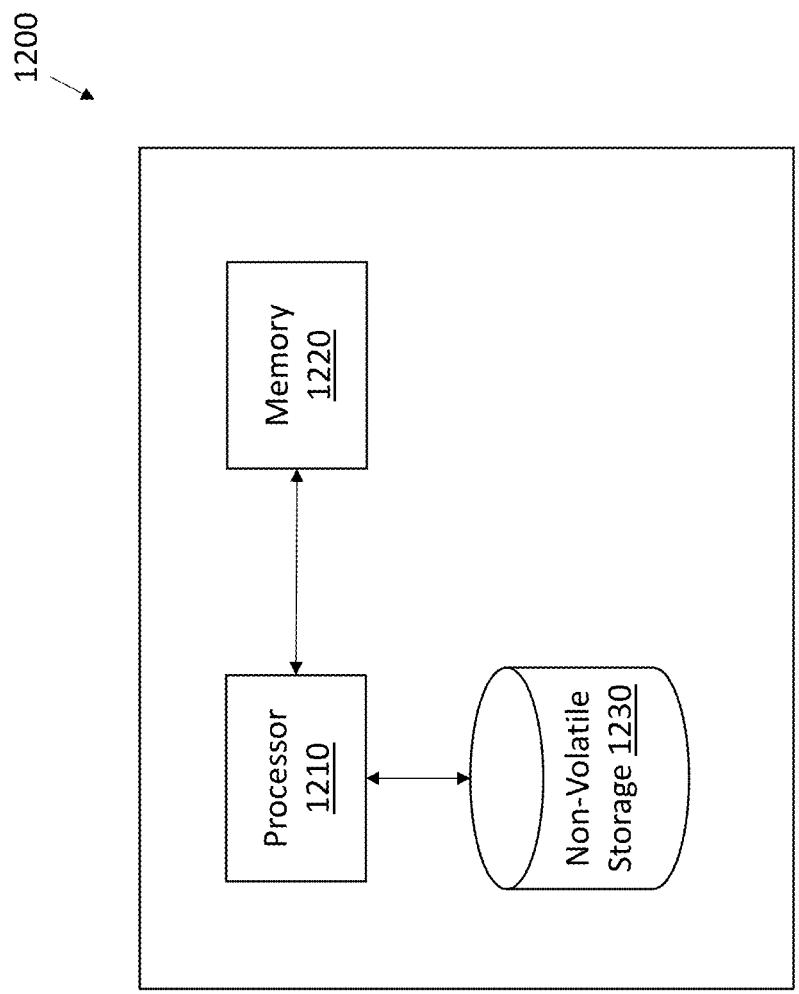

METHODS AND APPARATUS FOR ONLINE TEST TAKING

RELATED APPLICATIONS

This Application claims priority under 35 U.S.C. § 119(e) to U.S. Provisional Application Ser. No. 63/109,217, titled "METHODS AND APPARATUS FOR ONLINE TEST TAKING," filed on Nov. 3, 2020, which is herein incorporated by reference in its entirety.

TECHNICAL FIELD

The present invention relates generally to administering and proctoring online examinations. Specifically, the disclosure relates to a remote proctoring system that provides the user with an accessible online examination platform that includes a video monitoring feature to ensure the integrity of the examination environment and/or examination process, thus offering an integral and efficient examination proctoring solution.

BACKGROUND OF INVENTION

As online learning continues to grow and more online programs and courses continue to be developed, the need for administering online examinations increases. With security and fairness at the forefront of these needs, online exam monitoring systems have become highly sought after in higher education as well as technical training and education programs, especially considering the events of COVID19, SAT cheating schemes, home schooling and professional license exam continuity.

SUMMARY OF INVENTION

In accordance with the disclosed subject matter, systems and methods are provided for administering an online examination to a user.

Some embodiments relate to a system for administering an online examination to a user. The system includes a processor configured to perform layered digital analysis, based on first image data of an environment of the user received from a camera, a pre-examination scan of the environment of the user, and responsive to the pre-examination scan indicating the environment is appropriate for test taking, initiate the online examination by generating a user interface for display on an examination screen. The processor is configured to estimate, based on second multilayered image data scanning and of multiple geometric data points of the user, the behaviors of the user, the digital graphic and sound environment of the user while the user is using the user interface. The processor is configured to estimate one or more poses of the user and geometrically analyze the one or more poses to determine the user pose is indicative of improper examination behaviors; and based on the improper examination behavior, generate a warning system or to terminate the online examination.

In some examples, performing the pre-examination scan of the environment of the user by the processor includes acquiring a set of images of a plurality of perspectives of the environment that includes the first image data and processing the set of images to determine if the plurality of perspectives of the environment meets a set of predetermined rules.

In some examples, estimating one or more poses of the user by the processor includes receiving data indicative of a user pose that includes the second image data and processing the data using a trained machine learning model to determine an estimated pose of the user.

In some examples, the processor of the system is further configured to store data indicative of a count of a number of improper incidents associated with the online examination and a set of predefined rules, wherein each rule specifies one or more criteria indicative of an improper incident during test taking. The processor is also configured to further monitor the user and/or the user environment, for detection of an improper incident, including monitoring the user and/or the environment, based on the set of predefined rules; responsive to a determination that the improper incident was detected, increase the count of the number of improper incidents by one and issue the user a warning; and terminate the online examination if the count of the number of improper incidents exceeds a predetermined threshold.

In some examples, the improper incident includes moving a mouse cursor out of the examination screen. In some examples, the improper incident includes clicking on any element outside of the examination screen. In some examples, the improper incident includes the camera detecting a person who is not the user. In some examples, the improper incident includes the camera not detecting the user in front of the examination screen. In some examples, the warning includes a visual message on the examination screen.

In some examples, the processor is further configured to capture time-stamped images during an examination attempt of the user and store the first image data of the environment of the user and the time-stamped images.

Some embodiments relate to a method for administering an online examination to a user. The method includes performing, based on first image data of an environment of the user received from a camera, a pre-examination scan of the environment of the user; responsive to the pre-examination scan indicating the environment is appropriate for test taking, initiating the online examination by generating a user interface for display on an examination screen; estimating, based on second image data of the user while using the user interface, one or more poses of the user; and determining, based on the one or more poses of the user, the user pose is indicative of improper examination behavior; and based on the improper examination behavior, generating a warning or terminating the online examination.

In some examples, performing the pre-examination scan of the environment of the user of the method includes acquiring a set of images of a plurality of perspectives of the environment that includes the first image data and processing the set of images to determine if the plurality of perspectives of the environment meets a set of predetermined rules.

In some examples, estimating one or more poses of the user in the method includes receiving data indicative of a user pose that includes the second image data and processing the data using a trained machine learning model to determine an estimated pose of the user.

In some examples, the method further includes storing data indicative of a count of a number of improper incidents associated with the online examination and a set of predefined rules, wherein each rule specifies one or more criteria indicative of an improper incident during test taking; and monitoring the user, the user environment, or both, for detection of an improper incident, including monitoring the user and/or the environment, based on the set of predefined rules. The method also includes, responsive to a determination that the improper incident was detected, increasing the count of the number of improper incidents by one and issuing the user a warning and terminating the online examination if the count of the number of improper incidents exceeds a predetermined threshold.

In some examples, the improper incident includes moving a mouse cursor out of the examination screen. In some examples, the improper incident includes clicking on any element outside of the examination screen. In some examples, the improper incident includes the camera detecting a person who is not the user. In some examples, the improper incident includes the camera not detecting the user in front of the examination screen. In some examples, the warning includes a visual message on the examination screen.

In some examples, the method further includes capturing time-stamped images during an examination attempt of the user and storing the first image data of the environment of the user and the time-stamped images.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 12 is a diagram of an exemplary computerized apparatus that can perform the techniques described herein, according to some embodiments.

DETAILED DESCRIPTION OF INVENTION

Figure 1:
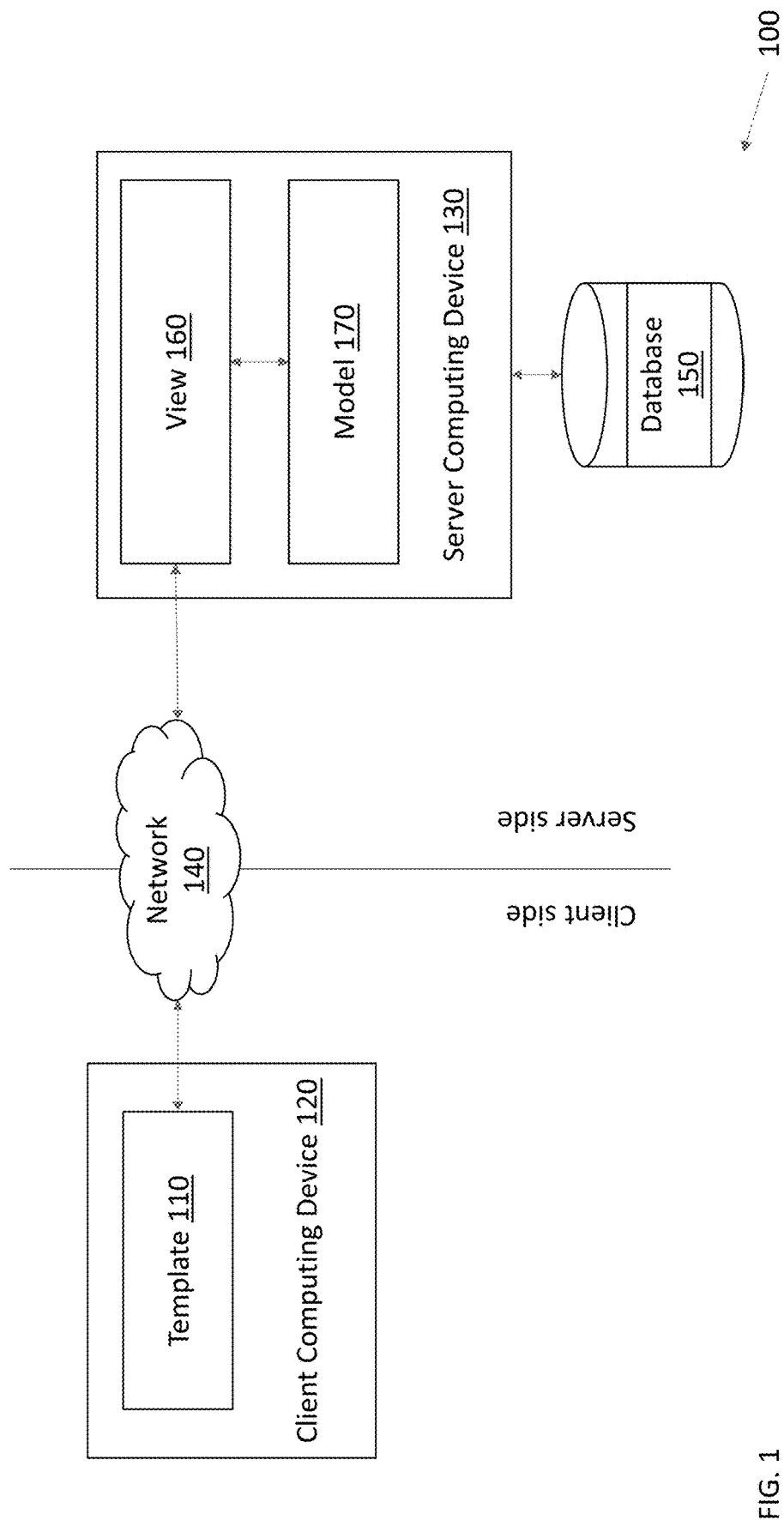
FIG. 1 is a diagram of exemplary online test system architecture, according to some embodiments.

Systems and methods described herein relate to administering and proctoring online examinations using a remote proctoring platform that employs the integration of traditional human intelligence gathering techniques and a layered and proprietary artificial intelligence algorithm. Coupled together, the systems and methods described herein deliver a secure environment for identity verification, including to create a secure environment. The inventor discovered and appreciated various deficiencies with conventional computerized and remote examination systems and the fact that they were remiss in activating asynchronous analysis during the examination event. Specifically, these systems lacked human oversight and technological markers to identify anomalistic activity from the test taker and their environment. For example, it can be desirable to provide for a comprehensive scanning of the test taking environment to ensure the adequacy of the examination environment (e.g., to confirm no other people are present in the examination environment, that no books or electronic devices are in the environment, and/or the like). As another example, conventional techniques do not adequately monitor the test taker during the testing process. The inventor implemented intelligence gathering techniques and developed technical improvements to conventional technologies and integrated them to address and remediate these and other vast deficiencies. The system described herein provides for pre-examination environment scans. The system also provides for real time monitoring, analysis, and recording of a test-taker's attempt of an online examination. The techniques can include performing a layered digital analysis. The techniques can include estimating, based on multilayered image data scanning and/or multiple geometric data points of the user, the behaviors of the user, the digital graphic and/or sound environment of the user.

The techniques can help to eliminate human error, bias and many of the issues surrounding identity verification. The elimination of human error and biases includes those associated with social, circumstantial and behavioral tendencies that could occur during a human proctored environment. Accordingly, aspects provide real time, objective, and secure artificial exam analysis using machine learning, cephalic and cervical positioning of the test taker, a combination of layered facial recognition technologies and techniques, detection of non-user motion anomalies within the frame, and takes necessary actions based on defined system rules. Recording of the exam attempt allows for supplemental review from an expert team of human auditors trained in identifying behavioral anomalies during test taking periods. Additionally, the system flags and isolates recordings of behavioral anomalies identified by the software using a specific algorithm to alert the human auditor when there is an anomaly. The system described herein may also allow exam administrators to customize the proctoring functionality and information collected for each exam based on use-case.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 is a diagram of an exemplary online test system 100, according to some embodiments. The system 100 includes a template interface 110 within a client computing device 120. The client computing device 120 may be any computing device, such as a smartphone, laptop/PC, tablet device, and/or the like, capable of running a web/desktop application. According to some embodiments, the client computing device 120 may require access to a camera. The camera may be integrated into the computing device 120 and/or may be disposed remote from the computing device 120. The client computing device 120 may communicate with the server computing device 130 through a network 140.

The server computing device 130 is in communication with a database 150. The server computing device 130 includes a view module 160 and a model 170. The template interface 110 is the interface on which visual content (e.g., including the examination user interface, described herein) is displayed to the user. According to some embodiments, the end-user may interact directly with template interface 110. In some embodiments, the content or data to be displayed on template interface 110 may be delivered by view module 160, which is the controller between the disconnected database objects (model 170). According to some embodiments, model 170 may be one or more database models which are an abstracted model of the database 150 that can interact with the business logic of the techniques described herein. In some embodiments, view module 160 may fetch relevant data from the database model 170 and deliver it through the network when requested by the template interface 110 (e.g., through user actions). According to some embodiments, the template interface 110 may also send data through the network that is received by view module 160 to be saved into the database 150 via model 170 (e.g., data generated through a user's interaction with the examination software, including images captured during the pre-examination set-up and/or during the examination for analysis by the server computing device 130).

While only one client computing device 120 is shown in FIG. 1, any number of devices 120 can communicate with the server computing device 130. For example, different users (such as students, schools, and/or the like) can use their own associated device 120 to communicate to server computing device 130. The server computing device 130 can be any computing device configured to perform the computerized methods described herein, such as a web server, a database server, a set of distributed computing devices, one or more cloud computing devices, one or more virtual machines, and/or the like.

Figure 2:
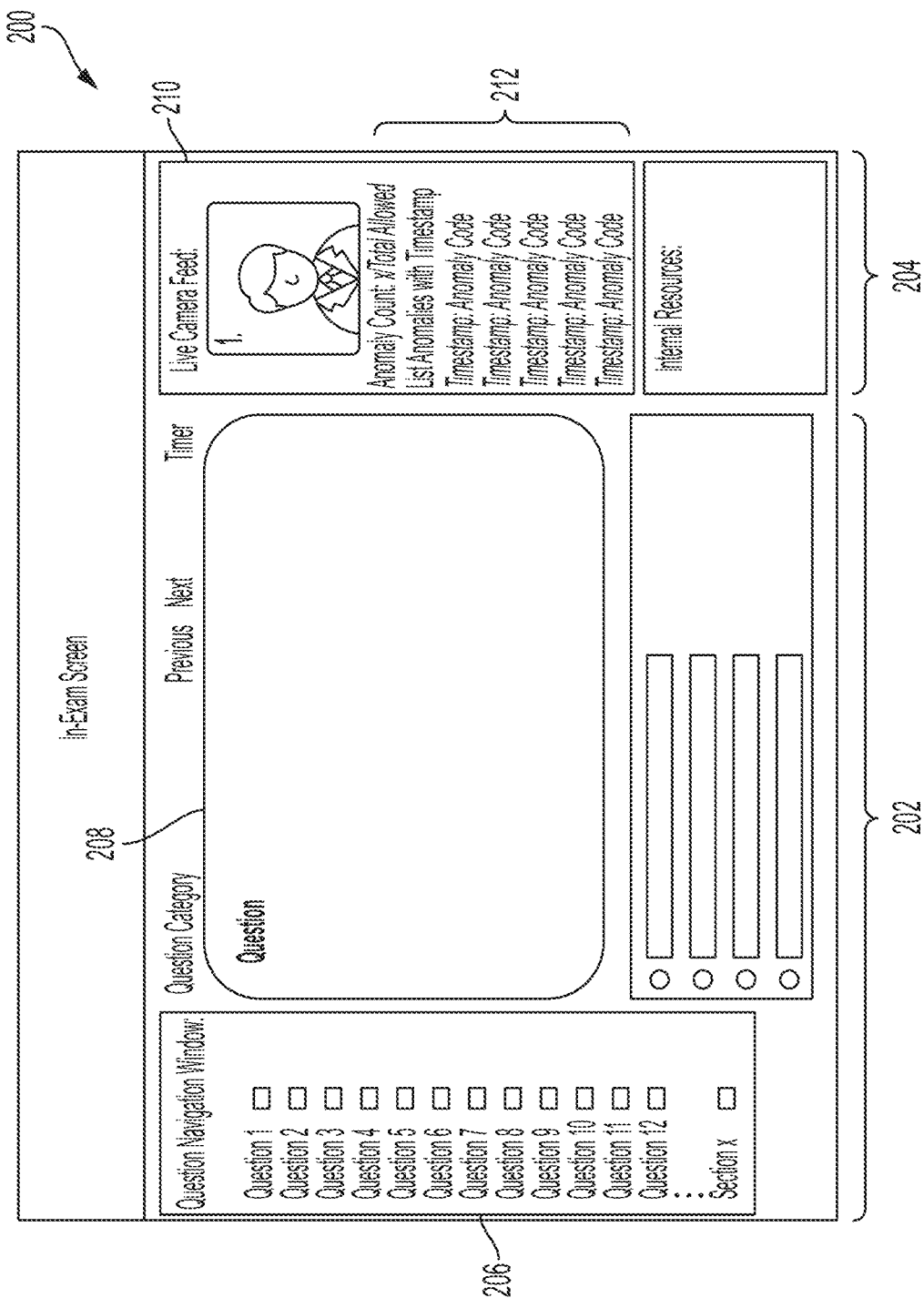
FIG. 2 is a diagram of an exemplary examination screen and program, according to some embodiments.

FIG. 2 is a diagram of an exemplary examination screen 200, according to some embodiments. The examination screen 200 (a user interface) can be displayed, for example, on a display of the client computing device 120. The examination screen 200 includes an examination portion 202 and a monitoring portion 204. In this example, the examination portion 202 includes components used for taking the examination, including a question navigation window 206 that allows the user to navigate through the examination questions, as well as an active question window 208 that allows the user to complete an answer for the selected question. The monitoring portion 204 includes a live camera feed view 210 that shows the live camera feed of the user taking the examination, as well as an anomaly section 212 that lists any anomalies that occur during the examination, as described further herein.

Figure 3:
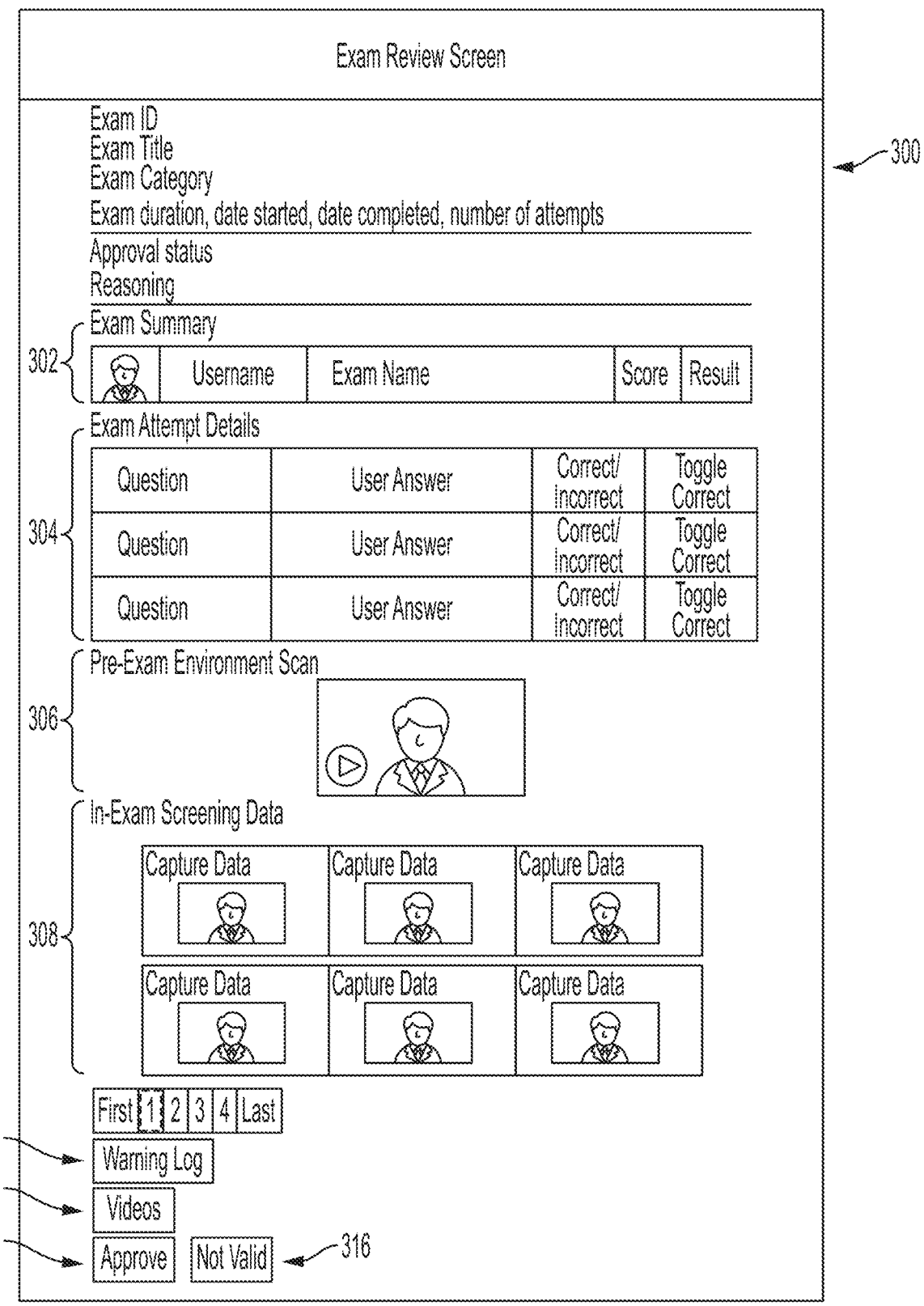
FIG. 3 is a diagram of an exemplary examination review screen, according to some embodiments.

FIG. 3 is a diagram of an exemplary examination review screen 300, according to some embodiments. The examination review screen 300 includes a summary section 302 of the user's examination attempt that includes the user's score (e.g., a numerical score) and associated result (e.g., pass/fail). In some embodiments, as shown in FIG. 3, the examination review screen 300 includes an examination attempt details section 304 with a list of the questions and data indicative of whether the user answered the questions correctly and/or incorrectly, a pre-environment scan section 306 that includes a video of the user's pre-environment scan, an in-exam screening data section 308 that includes still image captures of phases of the examination, a log of warnings the user received 310, and a video of the user's examination attempt 312. The examination review screen 300 also includes an "Approve" button 314 and a not valid button 316. In some embodiments, an auditor may view the examination review screen 300 to review the summary of the examination attempt and the auditor may further use the data to determine—whether the attempt will be approved or denied (using the buttons 314 and 316). The examination review screen 300 can be displayed on a computing device of the auditor (e.g., a computing device in communication with the server computing device 130 via the network 140 shown in FIG. 1).

Figure 4:
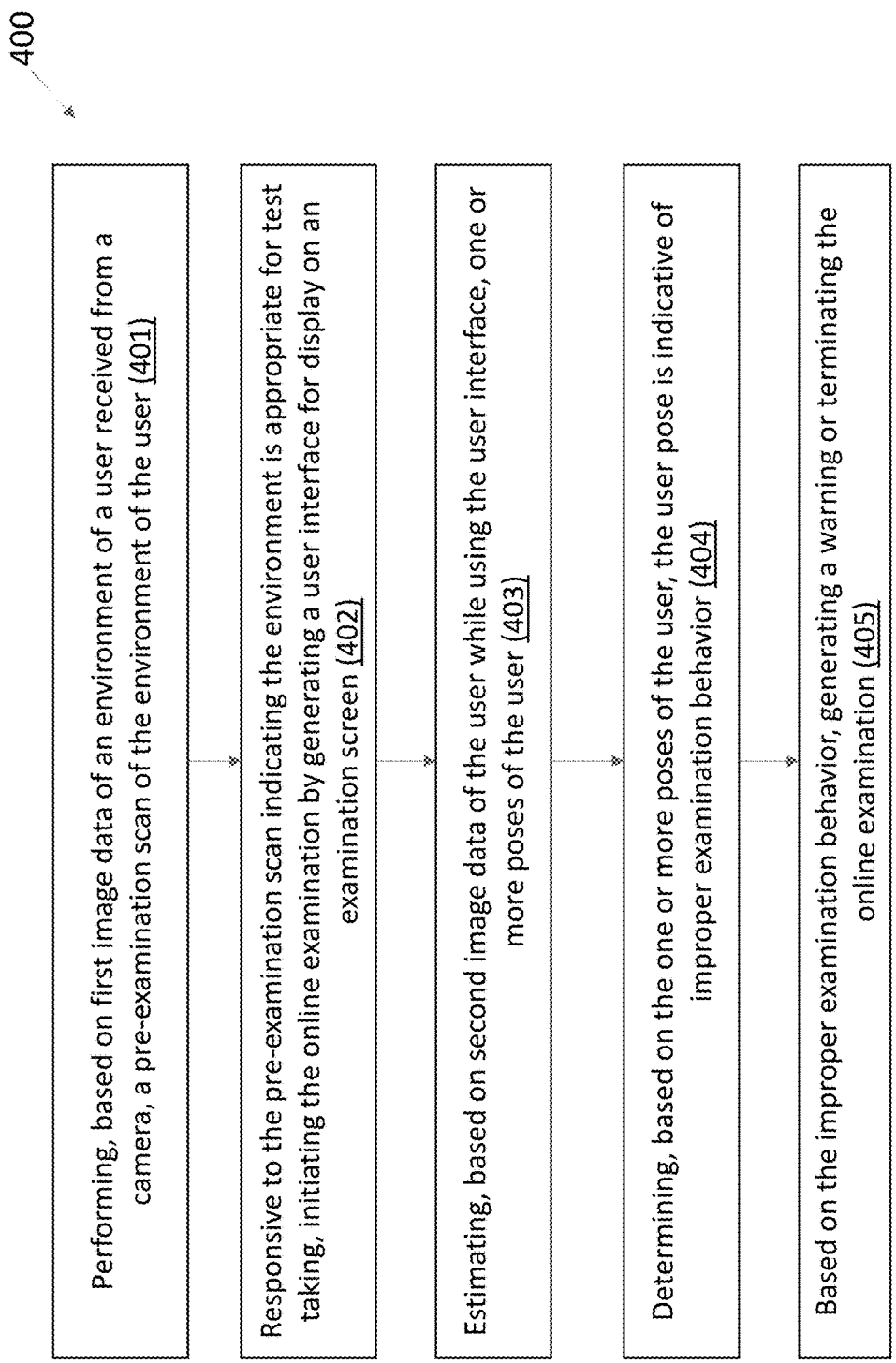
FIG. 4 is a flow chart showing an exemplary method of an environment scan and pose determination, according to some embodiments.

FIG. 4 is a flow chart showing an exemplary method 400 of a pre-examination environment scan and in-exam pose determination, according to some embodiments. The method 400 can be performed by, for example, the server computing device 130 shown in FIG. 1. At step 401, based on first image data of the user environment received from a camera, the computing device performs a pre-examination scan of the user's test taking environment. The pre-examination scan is discussed in further detail in conjunction with FIG. 5 and FIG. 6. At step 402, responsive to the computing device determining the pre-examination scan indicates the environment is appropriate for test taking, the computing device initiates the online examination by generating a user interface for display on an examination screen of the user's computing device, for example, as shown in FIG. 2. At step 403, based on second image data of the user while using the user interface, the computing device estimates one or more poses of the user (e.g., during the examination process). At step 404, based on the one or more poses of the user, the computing device determines whether the user pose is indicative of improper examination behavior. At step 405, based on improper examination behavior, the computing device may generate a warning and/or may terminate the online examination.

Referring to step 401, according to some embodiments, performing the pre-examination scan of the environment of the user may include acquiring a set of images from a plurality of perspectives of the user environment and processing the set of images to determine if the environment meets a set of predetermined rules. In some embodiments, a pre-examination scan may comprise scanning the background of the user, a 360 degree scan of the room the user is in, a scan of a table or surface the user/client computing device is on, a scan of the area behind the computing device (in the case the user uses a camera detached from the computing device), and a 90 degree scan of the user on both the right and left sides from the position the user will be in to take the examination, and/or the like. According to some embodiments, the user may also be prompted to move their head 90 degrees to the left and 90 degrees to the right and to expose their ears. In some embodiments, this may be required as a check before the exam to ensure the user is not wearing an earpiece that could be used to communicate with any outside party.

Referring to step 403, according to some embodiments, estimating the one or more poses of the user may include receiving data indicative of a user pose and processing the data using a trained machine learning model to determine an estimated pose of the user. According to some embodiments, the pre-examination scan 401 and/or in-examination monitoring described in steps 403-405 can be performed by the server computing device 130 in order to leverage remote computing resources during the examination.

In some embodiments, pose estimation may include body pose estimation, head pose estimation, body pose estimation coupled with head pose estimation, and/or the like. In some embodiments, overall posture estimation may include combining the results from body pose estimation and head pose estimation.

In some examples, a determination can be made on how engaged the user is during the examination by keeping track of the user's body movements of the user in real time. For example, this determination may be based on whether or not the user remains within set threshold movement boundaries within which the user must remain for the duration of the examination. In some embodiments, the system may flag the time and/or the period of time the user remained in poses outside of the set threshold movement boundaries. In some examples, video captured and/or metadata of anomalistic behavior as defined may be recorded for an auditor to review who may make an assessment as to whether or not suspicious behavior occurred during the exam. For example, the auditor may use the flagged anomalistic behavioral patterns to review the abnormal actions of a user and make a determination on the validity/authenticity of an exam if not already determined by the system during the exam, such as in step 904, further described in conjunction with FIG. 9. According to some embodiments, body pose estimation may be used to track upper body movements of the user in front of the camera. In some embodiments, body pose may be estimated based on movements of key body joints. In some examples, the key body joints may include the left shoulder, right shoulder, left elbow, right elbow, left wrist, right wrist, and/or the like.

According to some embodiments, specific numerical parameters can be set for each of the key joints along with the threshold it can afford to give to the user before the actions will be flagged. In some embodiments, an ideal pose may be a pose that conforms to the set specific numerical parameters and the corresponding thresholds. In some embodiments, based on movements of key body joints, the auditor can see the times the test-taker was not in the pose set within the ideal posture threshold. In some embodiments, the user may be notified if there is a deviation from the set ideal pose during the examination and a record for the time the user strayed away from the ideal pose may be recorded and flagged in the database in addition. In some examples, the user is notified about the infraction along with the timestamp to allow the user to correct their pose. In some examples, the record may include the period in the examination that the infraction occurred or continued for, along with a brief description which estimates the pose descriptively. In some embodiments, the ideal pose of the body may include that the user maintains a posture in which their left shoulder, elbow and wrist, facing the camera, are in a straight line and their right shoulder, elbow and wrist also face the camera in a straight line such that the user will be posing towards the camera with both shoulders in a straight line and the length between the two joints will be fully extended.

In some embodiments, the head pose of the user may be used to estimate the direction the user is facing with respect to the camera. According to some embodiments, the system may use certain points of reference on the head of the user to estimate a head pose. In some examples, the points of reference on the head of the user may include the tip of the nose, left corner of the left eye, right corner of the right eye, left corner of the mouth, right corner of the mouth, chin, and/or the like. In some embodiments, the head pose estimation may generate a rotation and translation of the head of the user. In some embodiments, the head pose estimation may generate a three-dimensional head pose model.

In some embodiments, the system may use head pose estimation to see if the user is paying attention to the examination screen which may be understood as the user facing the camera. In some embodiments, specific numerical parameters can be set for each of the points of reference on the head of the user along with the threshold it can afford to give to the user before the actions will be flagged. In some embodiments, an ideal pose may be a pose that conforms to the set specific numerical parameters and the corresponding thresholds. In some embodiments, the ideal pose of the head may be when the tip of the nose (i.e. of the user) directly points to the camera. In some embodiments, the system may also track when the user has been looking down to face his/her desk (e.g. looking at notes, and/or the like). In some examples, an infraction in this pose estimation technique may be when the user faces away or looks away from the camera and the user may be notified about the infraction along with the timestamp to allow the user to correct their pose.

In some embodiments, the system may use the rotation and translation generated by the head pose estimation and transform the 3D points represented in world coordinates to 3D points represented in camera coordinates. For example, the world coordinates may include a reference frame, coordinate system and/or the like. For example, the "Tip of the nose" in the generated three-dimensional head pose model may be represented by a point defined in a cartesian coordinate system, for example at coordinate (0.0, 0.0, 0.0). As described herein, the database record may include the period in the exam that the infraction occurred or continued for, along with a brief description that estimates the pose descriptively. For example, in the case of an infraction in which the user was looking towards the extreme right (relative to the camera), the descriptive record may be "User was seen facing to the right from 4:37 to 4:52 in the exam". As described herein, the user may additionally receive a notification indicating that a record was made and that an infraction was registered as a result of anomalistic head pose during the exam.

Referring to step 404, according to some embodiments, improper examination behavior may include moving a mouse cursor out of the examination screen, clicking on any element outside of the examination screen (such as attempting to open other applications, programs, tabs, and/or the like), the camera detecting a person who is not the user, the camera not detecting the user in front of the examination screen, the camera detecting multiple people in front of the examination screen, and/or the like. Proper and improper examination behavior is explained in further detail in conjunction with FIG. 11.

Referring to step 405, in some embodiments, the warning may be a visual warning, such as a warning message that appears on the examination screen. In some embodiments, the warning may appear on the user's screen with a status and timestamp.

Figure 5:
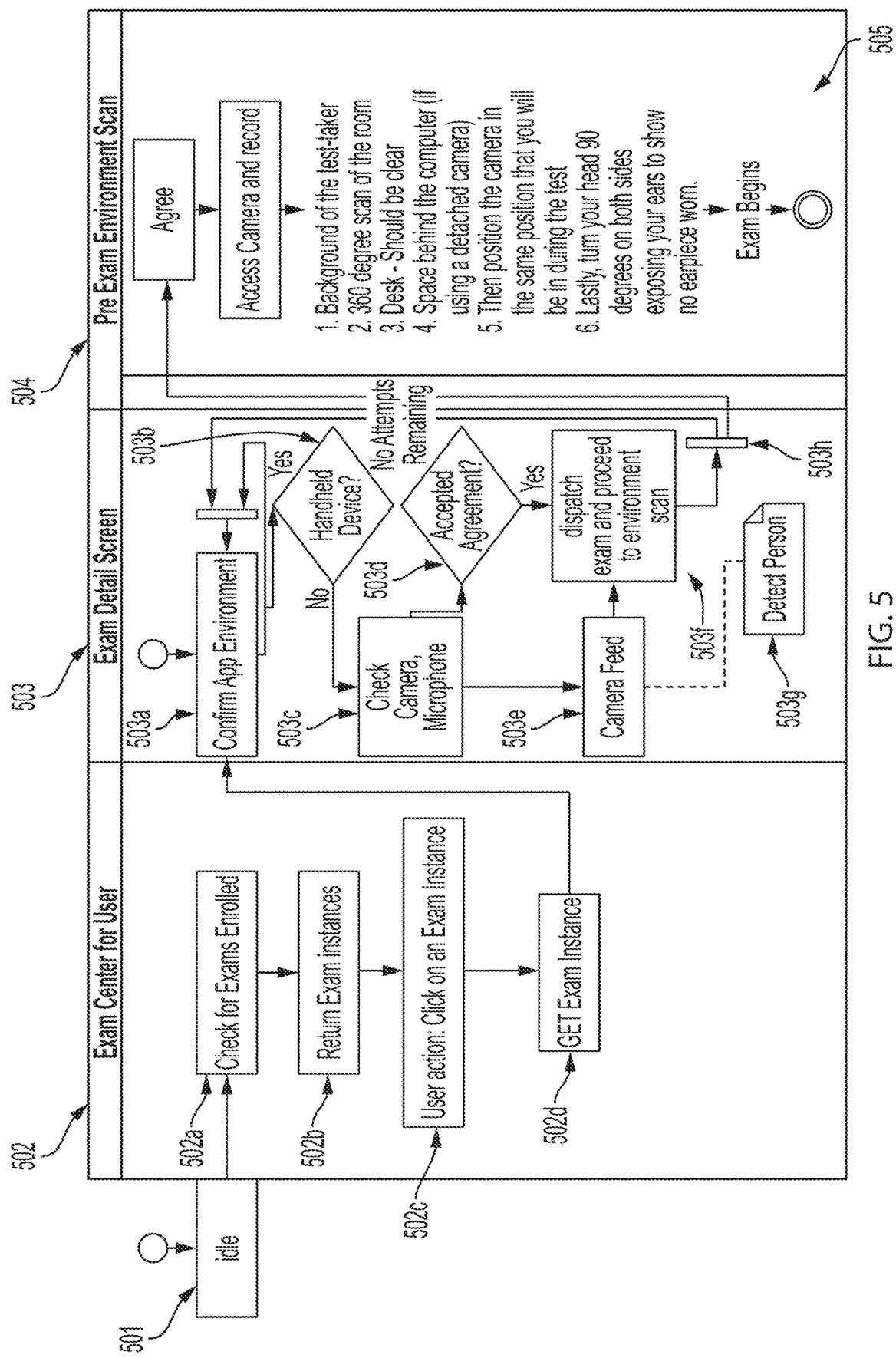
FIG. 5 is an exemplary diagram of the application process prior to the initiation of the online examination, according to some embodiments.

FIG. 5 is an exemplary diagram of the application process prior to the initiation of the online examination, according to some embodiments. In step 501, the system is in an idle state. In the group of steps 502, the system enters the examination center stage, during which the system will retrieve an examination instance of the user. In the group of steps 503, the system is in an examination detail stage, during which the system will confirm the suitability of the application environment. In step 504, the system performs a pre-examination environment scan, which is explained in further detail in conjunction with FIG. 6. After completion of the pre-examination environment scan, the system will begin the examination in step 505.

Referring to the group of steps 502, once the user enters the exam center program, the system will check for the exams the user is enrolled for during step 502*a*. In step 502*b*, the system may retrieve exam instances of the exams the user is enrolled for and return the set of exam(s) to the user, for example, by presenting the set of exam(s) on the examination screen. In step 502*c*, the user will click on an exam instance to indicate the examination they wish to take of the examination instances. In the next step 502*d* the system will select the selected exam instance as indicated by the user.

Referring to the group of steps 503, the examination screen of the user will show the examination detail screen during which the system will confirm the suitability of the application environment. During 503*b*, the system will check to see whether the computing device is a handheld device (e.g., a smartphone, since handheld devices may not be allowed for taking the exam). On determination that the device is a handheld device, the system proceeds back to step 503*a*. For example, the testing may not be conducted using a handheld device, and therefore the user can be informed appropriately. On determination that the device is not a handheld device (e.g., the device is a laptop computer, desktop computer, etc.), the system proceeds to step 503*c* and step 503*d*. Referring to step 503*c*, the system determines the functionality of the camera and microphone (e.g., to confirm the camera and/or microphone can be accessed by the system for the examination process). Referring to step 503*d*, the system determines if the user has accepted the examination agreement. In some embodiments, the agreement requires a user to indicate that all user information provided is accurate and complete. In step 503*f*, once the examination agreement has been accepted/confirmed and the camera feed is determined to be suitable at step 503*e*, the system will proceed to step 503*h* and dispatch the examination. Otherwise, at step 503*h*, if any condition(s) or check(s) of the group of steps 503 fail (e.g., the camera/microphone check at step 503*c*, the camera feed check at step 503*e*, and/or the user has not accepted the test taking agreement at 503*d*), then the method proceeds back to step 503*a*. In some embodiments, a user may be provided with a predetermined number of attempts to complete the group of steps 503. In some embodiments, step 503*e* may include determining if the system detects a person in the camera feed, as illustrated via step 503*g* (e.g., since if a person is not detected, then the camera may need to be repositioned and/or may not be suitable for examination taking).

Referring to the group of steps 504, the user may be asked to complete a pre-examination environment scan, for example, during step 401 of FIG. 4. During the pre-examination environment scan, the user may be prompted to capture scans containing a variety of views according to a set of requirements including those such as the requirements of FIG. 6. As shown in FIG. 5, the pre-examination scan can include recording (1) the background of the test-taker, (2) a 360 degree scan of the room, (3) the desk, (4) the space behind the computer, (5) the position of the camera for test taking, and/or (6) various pose(s) of the test taker when in the test taking position. Upon completion of the pre-examination environment scan, the system begins the examination as indicated by step 505.

Figure 6:
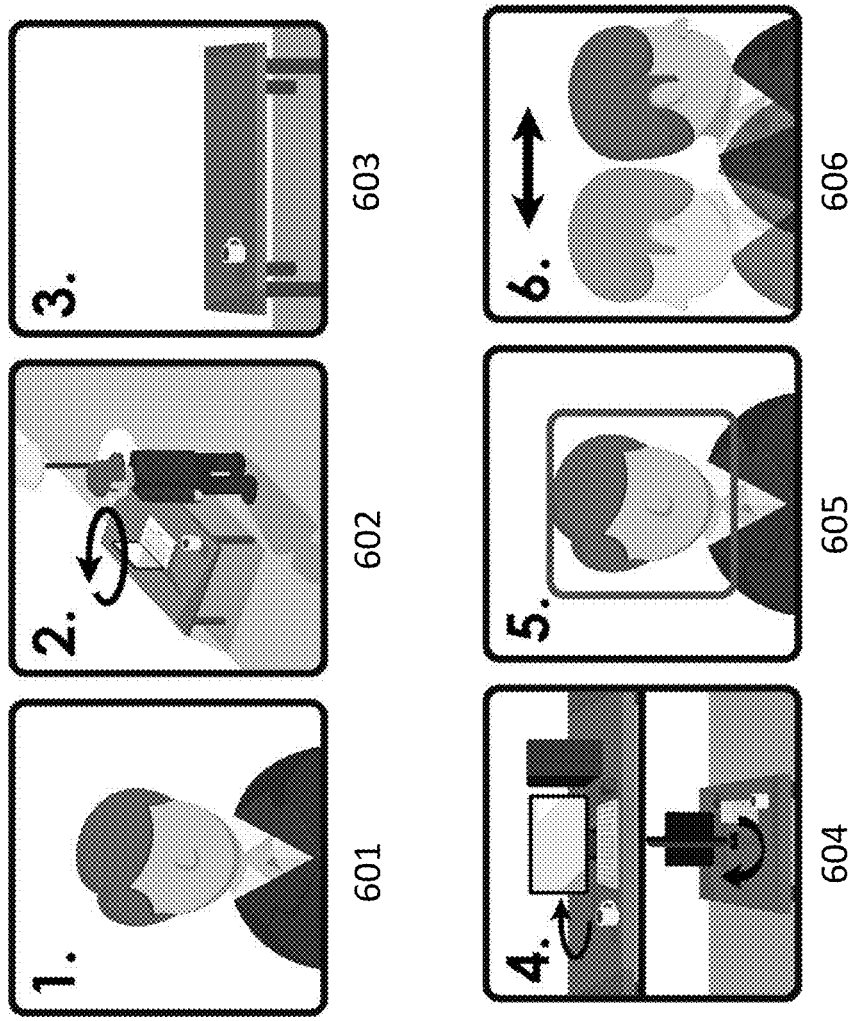
FIG. 6 is an exemplary diagram of some pre-environment scan requirements, according to some embodiments.

FIG. 6 is an exemplary diagram of some pre-environment scan requirements, according to some embodiments In step 601, the camera captures the user and the background of the user (e.g., while the user is seated and/or while the user is standing). In step 602, the user uses the camera to capture a 360 degree scan of the test taking environment of the user. For example, the user can pick up a laptop and rotate in 360 degrees to capture images around the test taking environment. Examples of the 360 degree scan are explained in further detail in conjunction with FIG. 6. In step 603, the user uses the camera to scan the desk and/or table area. For example, the user can pick up the laptop and stand back a few feet to capture images of the desk and/or area around the desk. In step 604, the user uses the camera to capture the space behind a computing device of the user (e.g., if the camera is detached and/or using a second camera). In step 605, the camera captures a view of the user in the position in which the camera will remain over the duration of the examination. In step 606, the camera captures the user's head turned approximately 90 degrees on either side with the user's ears exposed (e.g., to capture side profiles of the user). While this example uses 90 degrees, it should be appreciated this is for exemplary purposes only and is not intended to be limiting. In some embodiments, the user may be required to capture the environment within a given time frame (e.g., after which the examination may begin automatically). For example, a user can be given two minutes, five minutes, and/or the like to perform the pre-environment scan steps. According to some embodiments, the user may be prompted to perform certain actions to increase the efficacy of the pre-examination environment scan. For example, the user may be prompted to turn on lights (e.g., if the scene is too dark), to lower window shades and/or turn off lights (e.g., if the scene is too bright), and/or the like. It should be appreciated that the steps 601, 602, 603, 604, 605, and 606 can be executed altogether or in part, and may be ordered in any suitable way.

Figure 7:
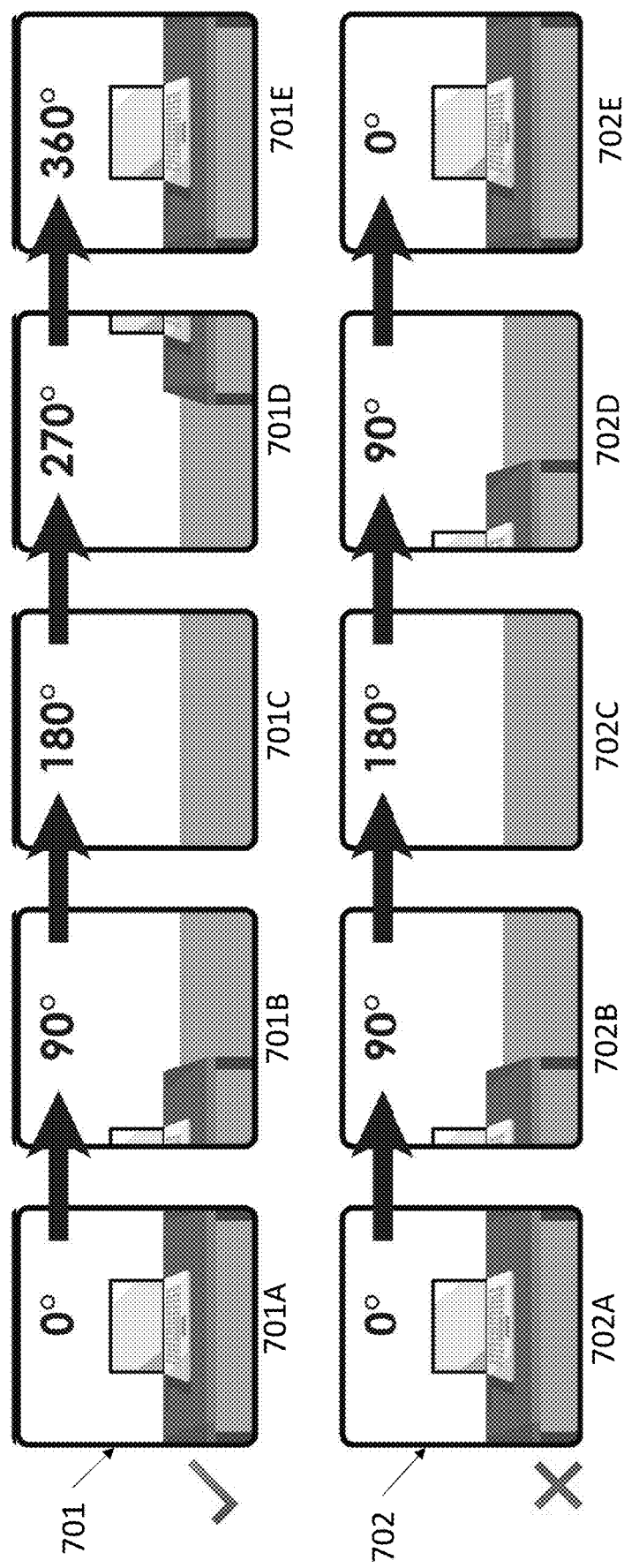
FIG. 7 is an exemplary diagram showing exemplary images captured for 360 degree scans, according to some embodiments.

FIG. 7 is a diagram showing exemplary images captured during 360 degree scans, according to some embodiments. The sequence 701 shows an example of an acceptable 360 degree scan of the exemplary environment shown at step 602 in FIG. 6, according to some embodiments. The sequence 702 shows an exemplary unacceptable 360 degree scan of the exemplary environment shown at step 602, according to some embodiments. Referring to sequence 701, the user starts with a view of the computing device of the user and scans from 0 degrees to 180 degrees, as shown at portions 701A, 701B and 701C of the sequence 700. The user then scans from 180 degrees to 360 degrees, as shown at portions 701D and 701E, thus performing a complete 360 degree scan. This scan is an acceptable 360 degree scan since images are captured at increments about the entire 360 degree environment. While in this example images are captured at 90 degree increments, other increments can be used, such as 30 degrees, 45 degrees, 60 degrees, and/or the like. Referring to sequence 702, the user starts with a view of the computing device of the user and scans from 0 degrees to 180 degrees to the right, as shown at portions 702A, 702B and 702C. The user then scans from 180 degrees back to 0 degrees, as shown at steps 702D and 702E, thus scanning the same area twice. Sequence 702 is therefore an example of an unacceptable 360 degree scan because the user failed to scan the area between 180 degrees and 360 degrees.

Figure 8:
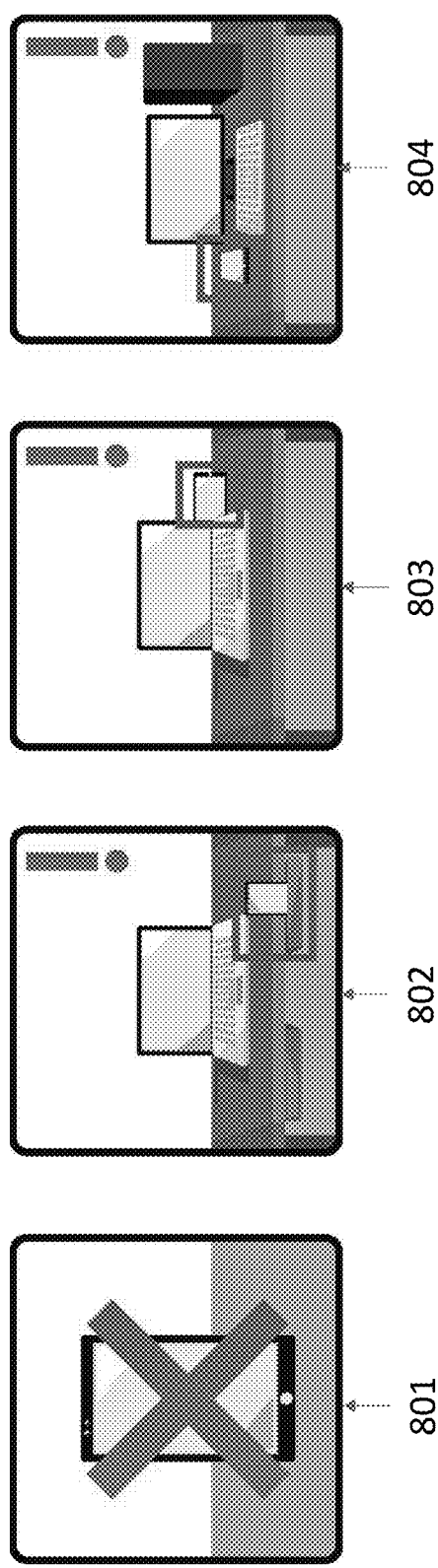
FIG. 8 is an exemplary diagram showing examples of test taking environments determined to be inappropriate, according to some embodiments.

The test taking computing devices, including the client computing device and/or server computing device(s), can process the images acquired during a pre-environment scan to determine whether the images show appropriate test taking environments. For example, the scans can look for books, smartphones, people, notes, white boards, and/or any other items that may be indicative of an inappropriate test taking environment. FIG. 8 is an exemplary diagram of images of test taking environments that are determined to be inappropriate, according to some embodiments. In these examples, the computing device processes the images to search for smartphones and/or tablet computing devices that are within and/or near the test taking environment. In some embodiments, external devices may not be allowed to be in the test taking environment of the user for the duration of the examination as in 801, 802, 803, and 804, which are examples of inappropriate test taking environments. In example 801, a mobile device was detected during a pre-examination environment scan which indicates an inappropriate test taking environment. In example 802, an external mobile device was detected in a drawer of the desk of the user during a pre-examination environment scan, for example, during the 0 degree scan portion of the 360 degree, which indicates an inappropriate test taking environment. In example 803, an external mobile device was detected behind the user computing device during a pre-examination environment scan, for example, during the 0 degree scan portion of the 360 degree, which indicates an inappropriate test taking environment. In example 804, an external mobile device was detected beside the user computing device during a pre-examination environment scan, for example, during the 0 degree scan portion of the 360 degree, which indicates an inappropriate test taking environment.

Figure 9:
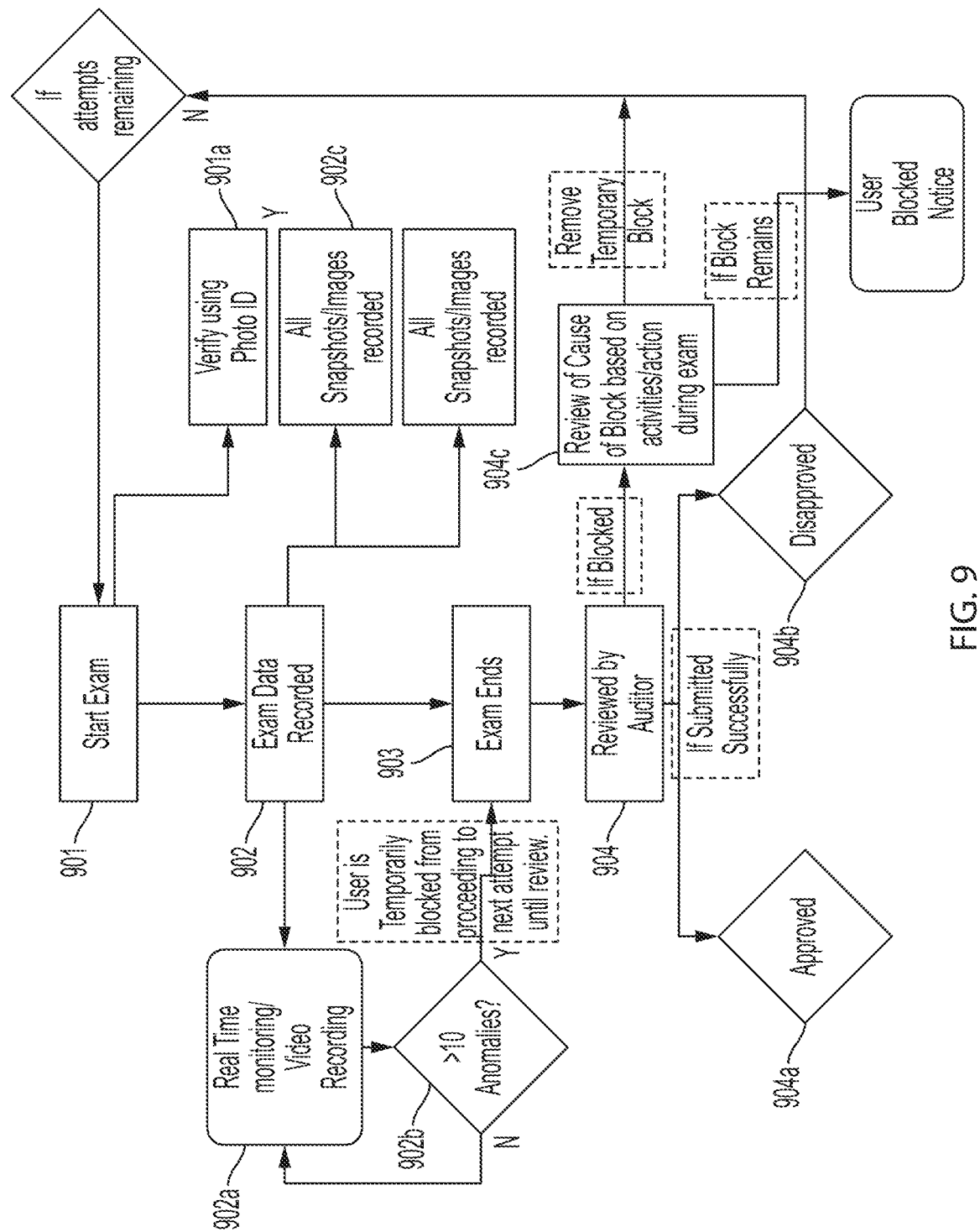
FIG. 9 is a flow chart of an exemplary examination attempt, according to some embodiments.

FIG. 9 is a flow chart of an exemplary examination attempt, according to some embodiments. For example, step 505 of FIG. 5 may include performing one or more steps of FIG. 9. In step 901, the examination begins. During step 901, the user may be required to verify their identity using a photo ID as in 901a. In step 902, the system may record user data, for example, using the camera and microphone. In step 903, the examination ends. In step 904 the examination and/or the recorded user data is evaluated by an auditor.

Referring to step 902, the user data may be recorded during the examination process. Recording the user data may include real time monitoring and or video recording 902a as well as recording snapshots and/or images 902c. In step 902b, any anomalies that occur during the examination, such as instances of improper examination behavior, may be recorded and counted. If the number of such anomalies surpasses a predetermined threshold at any point in the examination, the examination will automatically proceed to step 903 and terminate the examination. In some embodiments, the system can proceed to block the user from another examination attempt. If the number of anomalies does not surpass the predetermined threshold and the user completes the examination (e.g. the examination time ends or the user submits the examination for evaluation), the examination will also proceed to step 903.

Referring to step 904, the auditor may use recorded user data to determine the validity of a test attempt. If the user was temporarily blocked from the examination due to an indication determined from the user data that the user surpassed the allowed number of anomalies, the auditor will review the cause of the blocks based on activities and actions during the examination in step 904c. In the case the auditor determines to remove the block and the user still has examination attempts remaining, the user can start the exam again in step 901. If the auditor chooses to let the block remain, the user may receive a user blocked notice. If the examination was not blocked due to the number of anomalies (e.g., in the case of a complete examination), the auditor will either approve or disapprove the examination.

In some embodiments, the examination may be recorded end-to-end and saved for auditor review. In some embodiments, a full transcript of time-stamped still images that verify the users face and surroundings to record the test-taker's actions during the exam may be captured and saved for auditor review. According to some embodiments, an auditor may be able to see all of the attempted and non-attempted questions by the student and may also see other details of the examination, such as exam start time, end time and final score. According to some embodiments, the auditor may have access to end-to-end video recording of the exam that may include audio. In some embodiments, as part of the audit, the auditor may look at time-stamped still images annotated with user verification status, pose estimates of the user, and/or the question that the user is attempting at that instant. In some embodiments, this stream of images may offer a summarized compilation of the exam with stills that were flagged by the underlying algorithm/system during the exam. In some embodiments, the auditor may use crucial cues in the metadata linked to the snapshot to jump to a particular instant in the video recording of the exam to look at action of the user or around the user at that point of time.

Figure 10:
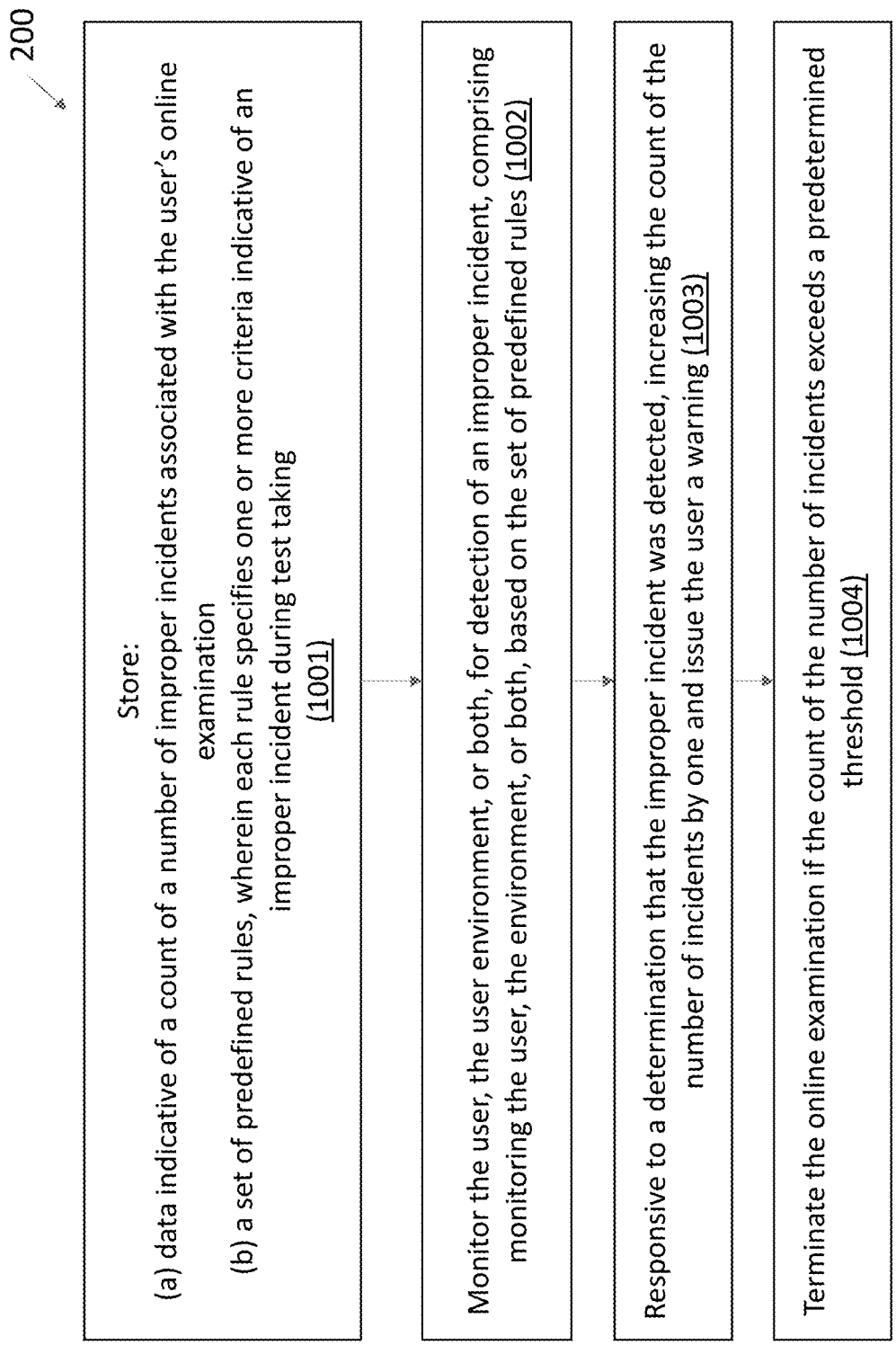
FIG. 10 is a is a flow chart showing an exemplary method 1000 of a warning system, according to some embodiments.

FIG. 10 is a flow chart showing an exemplary method 1000 of a test warning system, according to some embodiments. The method 1000 can be performed by, for example, the server computing device 130 shown in FIG. 1. At step 1001 the computing device stores data indicative of a count of a number of improper incidents associated with the user's online examination and a set of predefined rules, wherein each rule specifies one or more criteria indicative of an improper incident during test taking. The set of predefined rules is discussed in further detail in conjunction with FIG. 11. At step 1002, the computing device monitors the user and/or the user environment for detection of an improper incident, including monitoring the user, the environment, or both, based on the set of predefined rules. In response to a determination that there was an improper incident, the detected computing device increases the count of the number of incidents by one and issues the user a warning at step 1003. At step 1004, the computing device terminates the online examination if the count of the number of incidents exceeds a predetermined threshold.

Figure 11:
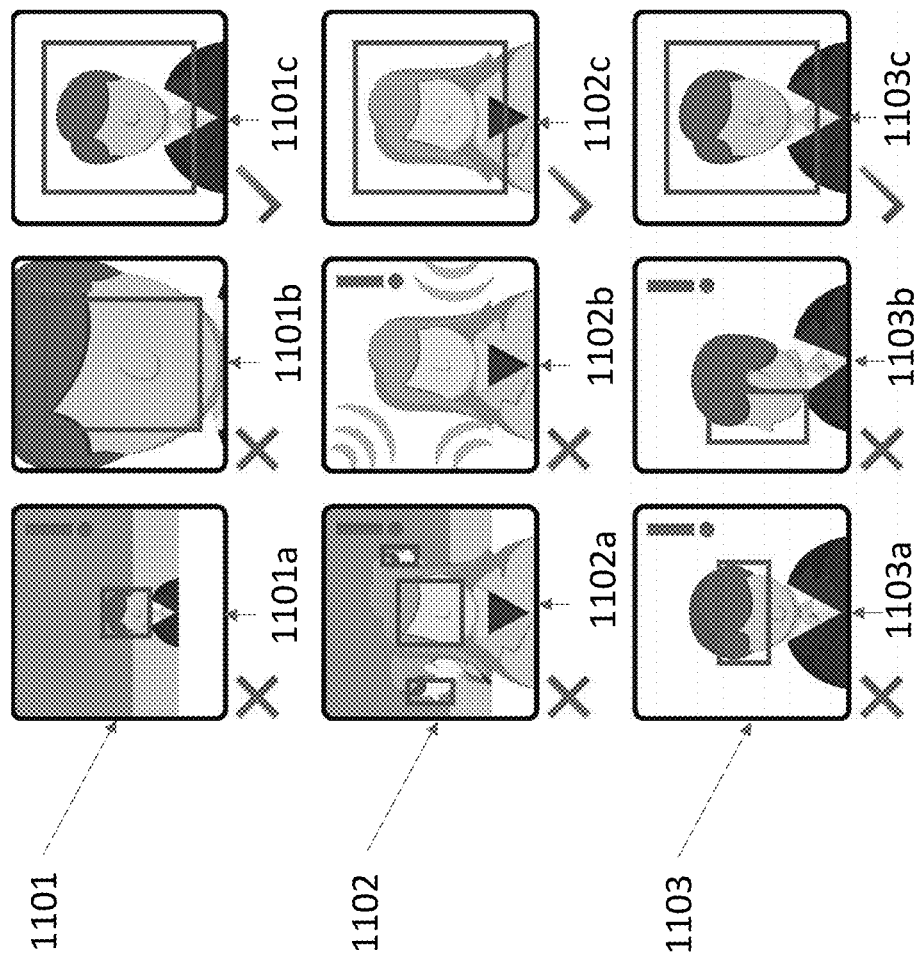
FIG. 11 is an exemplary diagram of proper and improper examination behavior based on predefined rules, according to some embodiments.

FIG. 11 is an exemplary diagram of examples of proper and improper examination behavior, according to some embodiments. The proper and improper behavior can be determined based on, for example, the predefined rules, such as those described in conjunction with step 1001 of FIG. 10. Examples 1101 show examples of proper and improper examination behavior regarding the distance of the user from the camera. Examples 1102 show examples of proper and improper examination behavior regarding the camera and microphone feed. Examples 1102 show examples of proper and improper examination behavior regarding the facial pose of the user.

Referring to examples 1101a, 1101b, and 1101c, a predefined rule may be that the user must maintain a proper distance from the camera. In example 1101a, the user is at a distance that is too far from the camera and is thus determined to be improper by the system. In example 1101b, the user is at a distance too close to the camera and is determined to be improper by the system. In example 1101c, the user is determined to be practicing correct examination behavior as the user is within a proper distance from the camera.

Referring to examples 1102a, 1102b, and 1102c, the camera and/or microphone feed may detect improper examination behavior according to the predefined rules. For example, a predetermined rule may be that no people who are not the user may be detected and/or no improper sounds may be detected from the microphone feed. Extraneous sound may include for example, people talking, whispering, and/or the like. In example 1102a, the camera detects people other than the user and the user is determined to be practicing improper examination behavior. In example 1102b, the microphone feed detects improper sounds and the user is determined to be practicing improper examination behavior. In example 1102c, the camera detects only the user and the microphone does not detect sounds and the user is determined to be practicing proper examination behavior.

Referring to examples 1103a, 1103b, and 1103c, a predefined rule may be that the user must maintain a proper pose, such as facing the examination screen and/or the like. In example 1103a, the user is determined to be looking down and away from the examination screen and is thus determined to be in an improper pose by the system. In example 1103b, the user is determined to be looking to the left and away from the examination screen and is determined to be in an improper pose by the system. In example 1103c, the user is determined to be practicing correct examination behavior as the user is facing the examination screen.

An illustrative implementation of a computer system 1200 that may be used to perform any of the aspects of the techniques and embodiments disclosed herein is shown in FIG. 12. The computer system 1200 may include one or more processors 1210 and one or more non-transitory computer-readable storage media (e.g., memory 1220 and one or more non-volatile storage media 1230). The processor 1210 may control writing data to and reading data from the memory 1220 and the non-volatile storage device 1230 in any suitable manner, as the aspects of the invention described herein are not limited in this respect. To perform functionality and/or techniques described herein, the processor 1210 may execute one or more instructions stored in one or more computer-readable storage media (e.g., the memory 1220, storage media, etc.), which may serve as non-transitory computer-readable storage media storing instructions for execution by the processor 1210.

In connection with techniques described herein, code used to implement the techniques described herein for providing examinations may be stored on one or more computer-readable storage media of computer system 1200. Processor 1210 may execute any such code to provide any techniques for managing devices as described herein. Any other software, programs or instructions described herein may also be stored and executed by computer system 1200. It will be appreciated that computer code may be applied to any aspects of methods and techniques described herein. For example, computer code may be applied to interact with an operating system to provide examinations through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects.

What is claimed is:

1. A system for administering an online examination to a user, the system comprising:
a processor configured to:
perform, based on first image data of an environment of the user received from a camera, a pre-examination scan of the environment of the user;
responsive to the pre-examination scan indicating the environment is appropriate for test taking, initiate the online examination by generating a user interface for display on an examination screen;
determine improper examination behavior using a multi-layered analysis to compound multiple points of reference, the determination comprising:
inputting second image data of the user while using the user interface into a trained machine learning model;
receiving an estimate of, based on the second image data, one or more poses of the user using a trained machine learning model, wherein the one or more poses include a head pose of the user and a body pose, and wherein the body pose includes an output of the trained machine learning model that indicates a position of one or more body joints of the user; and
determining, based on the one or more poses of the user estimated by the trained machine learning model, improper examination behavior by comparing the position of the one or more body joints of the user with a set threshold boundary for the position of the one or more body joints, and when the position of the one or more body joints of the user exceeds the set threshold boundary, determining that the user's behavior is improper; and
based on the improper examination behavior, generate a warning or terminate the online examination.

2. The system of claim 1, wherein performing the pre-examination scan of the environment of the user comprises:
acquiring a set of images of a plurality of perspectives of the environment that comprise the first image data; and
processing the set of images to determine if the plurality of perspectives of the environment meets a set of predetermined rules.

3. The system of claim 1, wherein the processor is further configured to:
store:
data indicative of a count of a number of incidents of improper examination behavior associated with the online examination; and
a set of predefined rules, wherein each rule specifies one or more criteria indicative of an incident of improper examination behavior during test taking; and
monitor the user, the user environment, or both, for detection of an incident of improper examination behavior, comprising monitoring the user, the environment, or both, based on the set of predefined rules;
responsive to a determination that the incident of improper examination behavior was detected, increase the count of the number of incidents of improper examination behavior by one and issue the user a warning; and
terminate the online examination if the count of the number of incidents of improper examination behavior exceeds a predetermined threshold.

4. The system of claim 3, wherein the incident of improper examination behavior comprises moving a mouse cursor out of the examination screen.

5. The system of claim 3, wherein the incident of improper examination behavior comprises clicking on any element outside of the examination screen.

6. The system of claim 3, wherein the incident of improper examination behavior comprises the camera detecting a person who is not the user.

7. The system of claim 3, wherein the incident of improper examination behavior comprises the camera not detecting the user in front of the examination screen.

8. The system of claim 3, wherein the warning comprises a visual message on the examination screen.

9. The system of claim 3, further comprising:
the processor further configured to:
capture time-stamped images during an examination attempt of the user; and
store the first image data of the environment of the user and the time-stamped images.

10. The system of claim 1, wherein the one or more joints in the upper body of the user includes two or more joints, the two or more joints including a shoulder and an elbow.

11. A method for administering an online examination to a user, the method comprising:
performing, based on first image data of an environment of the user received from a camera, a pre-examination scan of the environment of the user;
responsive to the pre-examination scan indicating the environment is appropriate for test taking, initiating the online examination by generating a user interface for display on an examination screen;
determining improper examination behavior using a multi-layered analysis to compound multiple points of reference, the determination comprising:
inputting second image data of the user while using the user interface into a trained machine learning model;
receiving an estimate of, based on second image data, one or more poses of the user using a trained machine learning model, wherein the one or more poses include a head pose of the user and a body pose, and wherein the body pose includes an output of the trained machine learning model that indicates a position of one or more body joints of the user; and
determining, based on the one or more poses of the user estimated by the trained machine learning model, improper examination behavior by comparing the position of the one or more body joints of the user with a set threshold boundary for the position of the one or more body joints, and when the position of the one or more body joints of the user exceeds the set threshold boundary, determining that the user's behavior is improper; and
based on the improper examination behavior, generating a warning or terminating the online examination.

12. The method of claim 11, wherein performing the pre-examination scan of the environment of the user comprises:
acquiring a set of images of a plurality of perspectives of the environment that comprise the first image data; and
processing the set of images to determine if the plurality of perspectives of the environment meets a set of predetermined rules.

13. The method of claim 11, further comprising:
storing data indicative of a count of a number of incidents of improper examination behavior associated with the online examination and a set of predefined rules, wherein each rule specifies one or more criteria indicative of an incident of improper examination behavior during test taking; and
monitoring the user, the user environment, or both, for detection of an incident of improper examination behavior, comprising monitoring the user, the environment, or both, based on the set of predefined rules;
responsive to a determination that the incident of improper examination behavior was detected, increasing the count of the number of incidents of improper examination behavior by one and issuing the user a warning; and
terminating the online examination if the count of the number of incidents of improper examination behavior exceeds a predetermined threshold.

14. The method of claim 13, wherein the incident of improper examination behavior comprises moving a mouse cursor out of the examination screen.

15. The method of claim 13, wherein the incident of improper examination behavior comprises clicking on any element outside of the examination screen.

16. The method of claim 13, wherein the incident of improper examination behavior comprises the camera detecting a person who is not the user.

17. The method of claim 13, wherein the incident of improper examination behavior comprises the camera not detecting the user in front of the examination screen.

18. The method of claim 13, wherein the warning comprises a visual message on the examination screen.

19. The method of claim 13, further comprising:
capturing time-stamped images during an examination attempt of the user; and
storing the first image data of the environment of the user and the time-stamped images.

20. The method of claim 13, wherein the one or more joints in the upper body of the user includes two or more joints, the two or more joints including a shoulder and an elbow.

* * * * *